(12) United States Patent
Pedretti et al.

(10) Patent No.: US 9,670,009 B2
(45) Date of Patent: Jun. 6, 2017

(54) TRANSFER DEVICE FOR TRANSFERRING SEALED PACKAGES OF A POURABLE FOOD PRODUCT AND METHOD OF REMOVING FALLEN SEALED PACKAGES FROM THE TRANSFER DEVICE

(75) Inventors: Richard Pedretti, Casinalbo di Formgine (IT); Andrea Catellani, Modena (IT)

(73) Assignee: TETRA LAVAL HOLDINGS & FINANACE S.A., Pully (CH)

(*) Notice: Subject to any disclaimer, the term of this patent is extended or adjusted under 35 U.S.C. 154(b) by 598 days.

(21) Appl. No.: 14/127,520

(22) PCT Filed: Sep. 5, 2012

(86) PCT No.: PCT/EP2012/067246
§ 371 (c)(1),
(2), (4) Date: Jan. 22, 2014

(87) PCT Pub. No.: WO2013/064292
PCT Pub. Date: May 10, 2013

(65) Prior Publication Data
US 2014/0123595 A1 May 8, 2014

(30) Foreign Application Priority Data

Oct. 31, 2011 (EP) .................................... 11187352

(51) Int. Cl.
*B65G 47/24* (2006.01)
*B65G 47/46* (2006.01)
(Continued)

(52) U.S. Cl.
CPC .............. *B65G 47/46* (2013.01); *B65B 65/00* (2013.01); *B65G 21/2072* (2013.01); *B65B 61/28* (2013.01); *B65G 47/256* (2013.01)

(58) Field of Classification Search
CPC .... B65G 2201/0244; B65G 2201/0252; B65G 47/24; B65G 47/256; B65G 47/846
(Continued)

(56) References Cited

U.S. PATENT DOCUMENTS 3,097,732 A * 7/1963 Engleson ............. B65G 47/256
198/398
3,369,642 A * 2/1968 Hennig ................... B65B 57/04
198/383

(Continued)

FOREIGN PATENT DOCUMENTS

EP 0849197 A1 6/1998
EP 1650143 A1 4/2006
(Continued)

OTHER PUBLICATIONS

International Search Report (PCT/ISA/210) mailed on Nov. 15, 2012, by the European Patent Office as the International Searching Authority for International Application No. PCT/EP2012/067246.
(Continued)

*Primary Examiner* — James R Bidwell
(74) *Attorney, Agent, or Firm* — Buchanan Ingersoll & Rooney PC

(57) ABSTRACT

There is disclosed a transfer device for transferring sealed packages of a pourable food product, comprising a transporter for conveying packages along an at least partly curved path; transfer device also comprises a through opening which is arranged on one side of path and is adapted to allow the discharge of packages that have fallen along path.

19 Claims, 3 Drawing Sheets

(51) Int. Cl.
    *B65G 21/20*     (2006.01)
    *B65B 65/00*     (2006.01)
    *B65B 61/28*     (2006.01)
    *B65G 47/256*     (2006.01)

(58) Field of Classification Search
    USPC ........... 198/396, 398, 397.04, 397.05, 480.1,
    198/481.1, 450, 441
    See application file for complete search history.

(56) References Cited

U.S. PATENT DOCUMENTS

| | | | |
|---|---|---|---|
| 3,610,399 A * | 10/1971 | Friedrich | B65G 47/256 |
| | | | 198/398 |
| 4,921,106 A | 5/1990 | Spatafora et al. | |
| 5,009,550 A * | 4/1991 | Hilbish | B65G 47/682 |
| | | | 209/656 |
| 5,299,675 A | 4/1994 | Schumann et al. | |
| 5,564,551 A * | 10/1996 | Schmitt | B65B 35/10 |
| | | | 198/390 |
| 6,065,587 A | 5/2000 | Schindel | |
| 6,607,067 B1 * | 8/2003 | Aoyama | B65G 47/1421 |
| | | | 198/391 |
| 2006/0182610 A1 | 8/2006 | Sala et al. | |
| 2014/0131173 A1 | 5/2014 | Pedretti et al. | |
| 2014/0194267 A1 | 7/2014 | Pradelli | |
| 2014/0196417 A1 | 7/2014 | Galata | |
| 2014/0223858 A1 | 8/2014 | Pedretti et al. | |
| 2014/0228193 A1 | 8/2014 | Pradelli et al. | |

FOREIGN PATENT DOCUMENTS

| | | | |
|---|---|---|---|
| JP | S43-4334 U | | 2/1968 |
| JP | 1-247317 | * | 10/1989 ........................ 47/24 |
| JP | 2001-019144 A | | 1/2001 |
| JP | 2010-168071 A | | 8/2010 |
| JP | 2011126700 A | | 6/2011 |
| JP | 2011140350 A | | 7/2011 |

OTHER PUBLICATIONS

Office Action (Notice of Reasons for Rejection) issued on May 9, 2016, by the Japanese Patent Office in corresponding Japanese Patent Application No. 2014-537534, and English translation of the Office Action. (7 pages).
U.S. Appl. No, 14/127,505, filed Feb. 11, 2014, Pedretti et al.
U.S. Appl. No. 14/127,613, filed Jan. 24, 2014, Pedretti et al.
U.S. Appl. No. 14/127,586, filed Jan. 24, 2014, Galata.
U.S. Appl. No. 14/127,506, filed Jan. 22, 2014, Pedretti et al.
U.S. Appl. No. 14/127,503, filed Feb. 11, 2014, Pradelli.
Office Action issued on May 13, 2016, by the Russian Patent Office in corresponding Russian Patent Application No. 2014121887 and an English translation of the Office Action. (8 pgs).

* cited by examiner

TRANSFER DEVICE FOR TRANSFERRING SEALED PACKAGES OF A POURABLE FOOD PRODUCT AND METHOD OF REMOVING FALLEN SEALED PACKAGES FROM THE TRANSFER DEVICE

TECHNICAL FIELD

The present invention relates to a transfer device for transferring sealed packages of a pourable food product.

The present invention also relates to a method of removing fallen sealed packages of a pourable food product from the transfer device.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which are then fed to a folding unit to form the finished packages.

More specifically, the pillow packs substantially comprise a main portion, and opposite top and bottom end portions tapering from main portions towards respective top and bottom sealing bands which extend substantially orthogonal to the axis of the pack. In detail, each end portion is defined by a pair of respective trapezoidal walls which extend between main portion of the pack and the relative sealing band.

Each pillow pack also comprises, for each top and bottom end portion, an elongated substantially rectangular fin projecting from respective sealing bands; and a pair of substantially triangular flaps projecting from opposite sides of relative end portion and defined by respective trapezoidal walls.

The end portions are pressed towards each other by the folding unit to form flat opposite end walls of the pack, while at the same time folding the flaps of the top portion onto respective lateral walls of the main portion and the flaps of the bottom portion onto the bottom sealing band.

The layout of the packaging machine requires that the folded packages are outputted, at an end station, along a first direction and in a first sense.

However, the layout of the folding unit is such that the folding unit outputs the folded packages along a second direction parallel to and staggered from the first direction, and in a second sense opposite to the first sense.

As a consequence, the packaging machine comprises a transfer device which is arranged downstream from the folding unit, and is adapted to convey the folded packages along an arch of 180 degrees which extends between the first and the second direction.

In particular, the known transfer devices substantially comprise:
 a frame;
 a looped chain conveyor which comprises a work branch and a return branch; and
 a top and a bottom full idle disks counter-rotating about a common axis, and adapted to support the chain conveyor relative to the frame.

The work branch of the chain comprises, in turn:
 an inlet rectilinear portion which is fed with the folded packages from the output station of the folding unit;
 a curved intermediate portion shaped as an arch of 180 degrees which has a centre on the axis of the disk and is supported by the top disk; and
 an outlet rectilinear portion which defines the end station of the packaging machine.

The return branch is shaped as the work branch.

In particular, folded packages move along the inlet rectilinear portion in the second sense, opposite to the first sense, and move along the outlet rectilinear portion in the first sense.

Furthermore, the curved portions of the work and return branch are supported by the peripheral regions of first halves of top and bottom disk respectively. The second halves of the disks do not cooperate with the chain conveyor.

The top and bottom disks are also supported by the fixed frame at their rotation axis.

The Applicant has found that there is the risk that, as moving along the curved portion of the transporting, the packages fall over the top disk, for example because the flaps are not perfectly sealed and, therefore, packages are unstable.

Moreover, the fallen packages could stop along the curved portion and cause the fall of further packages, thus determining the stop of the transfer device and, therefore, of the whole packaging machine.

A need is felt within industry to avoid that the fallen packages could interfere with the correct operation of the transfer device and, therefore, of the whole packaging machine.

DISCLOSURE OF INVENTION

It is therefore an object of the present invention to provide a transfer device for transferring sealed packages of a pourable food product, designed to meet the above-identified need in a straightforward and economic manner.

This object is achieved by a transfer device for transferring sealed packages of a pourable food product, as claimed in claim 1.

The present invention also relates to a method of removing fallen sealed packages of a pourable food product, as claimed in claim 15.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
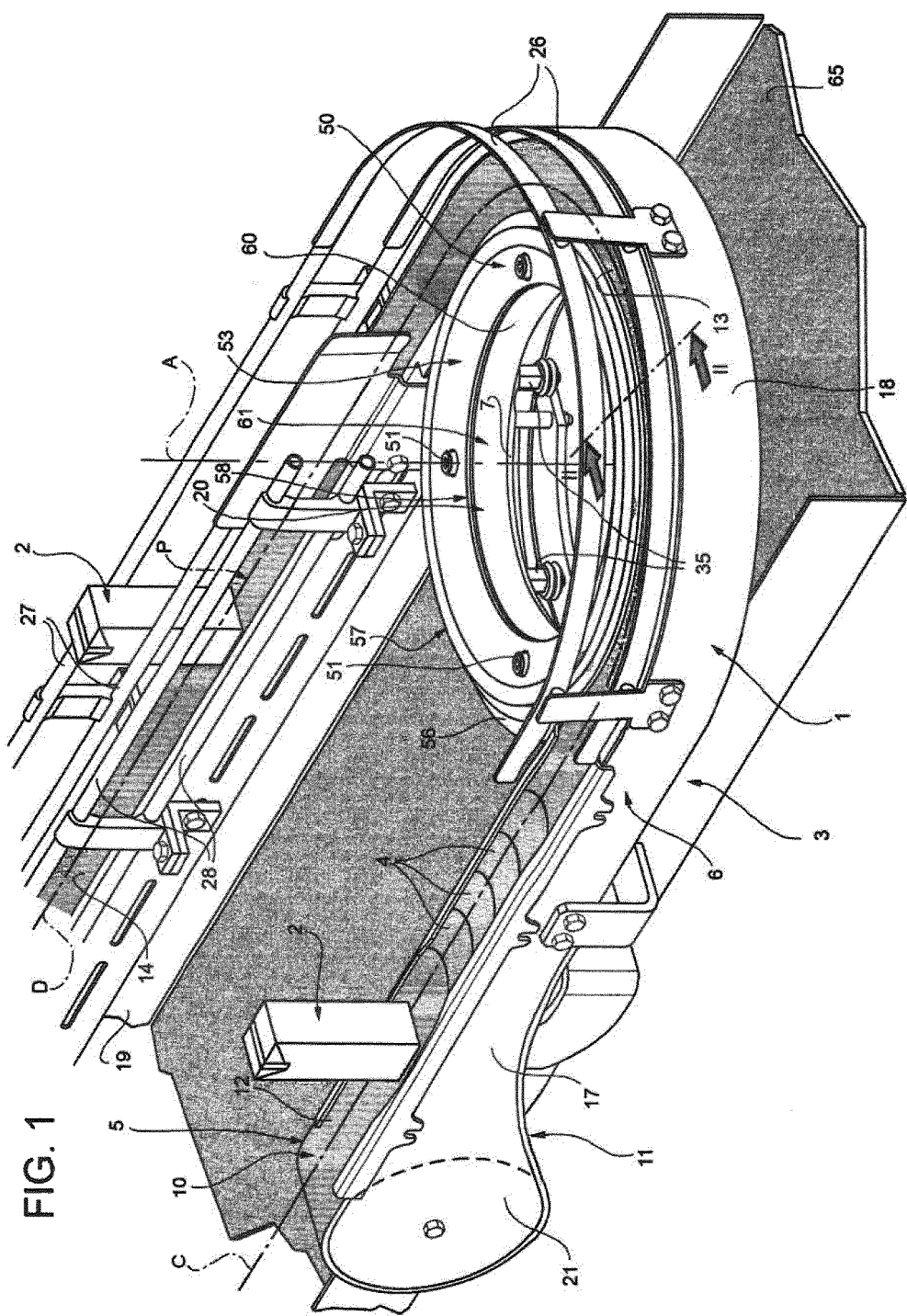
FIG. 1 is a perspective view of the transfer device according to the present invention.
Figure 2:
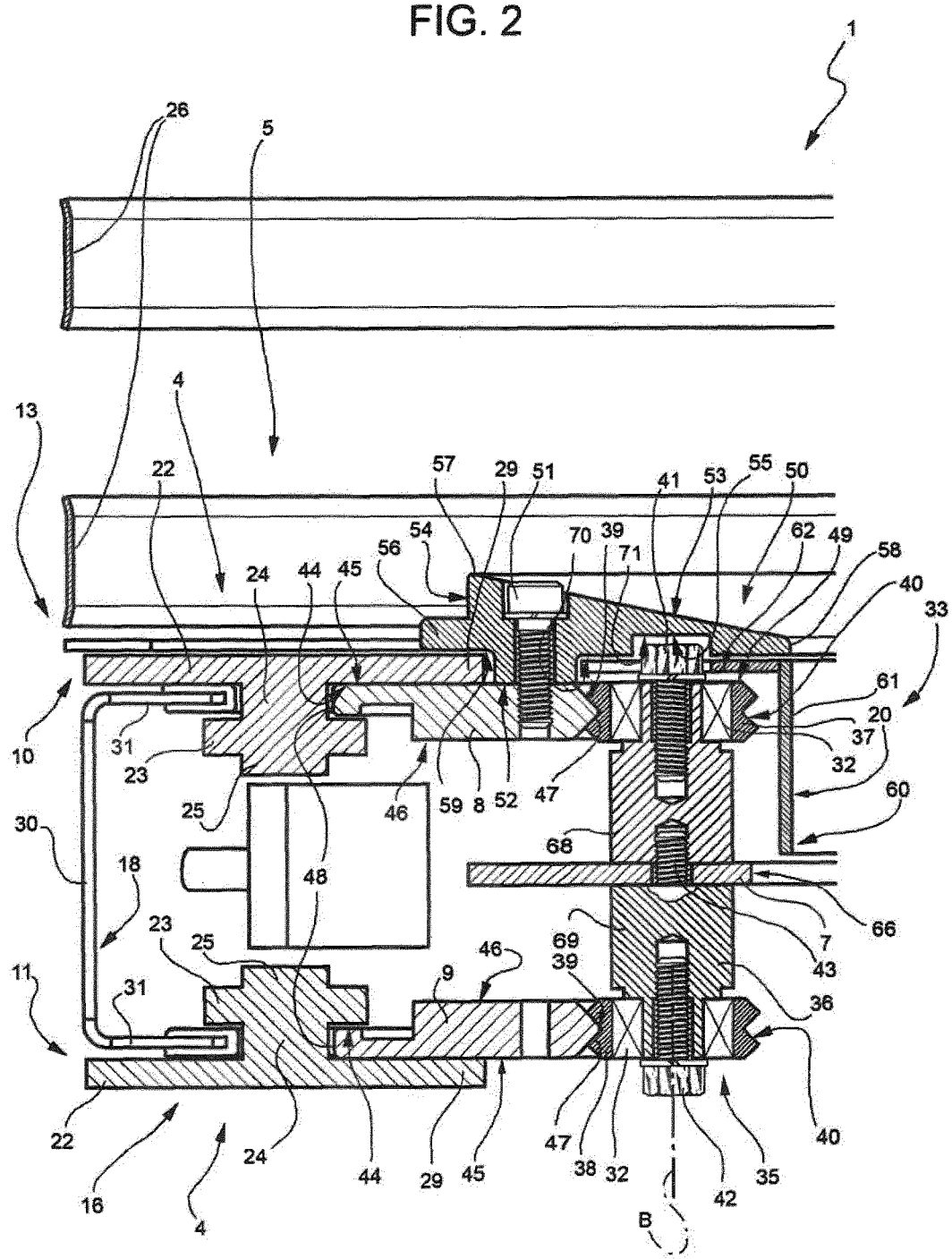
FIG. 2 is an enlarged view of a section along line II-II of FIG. 1.
Figure 3:
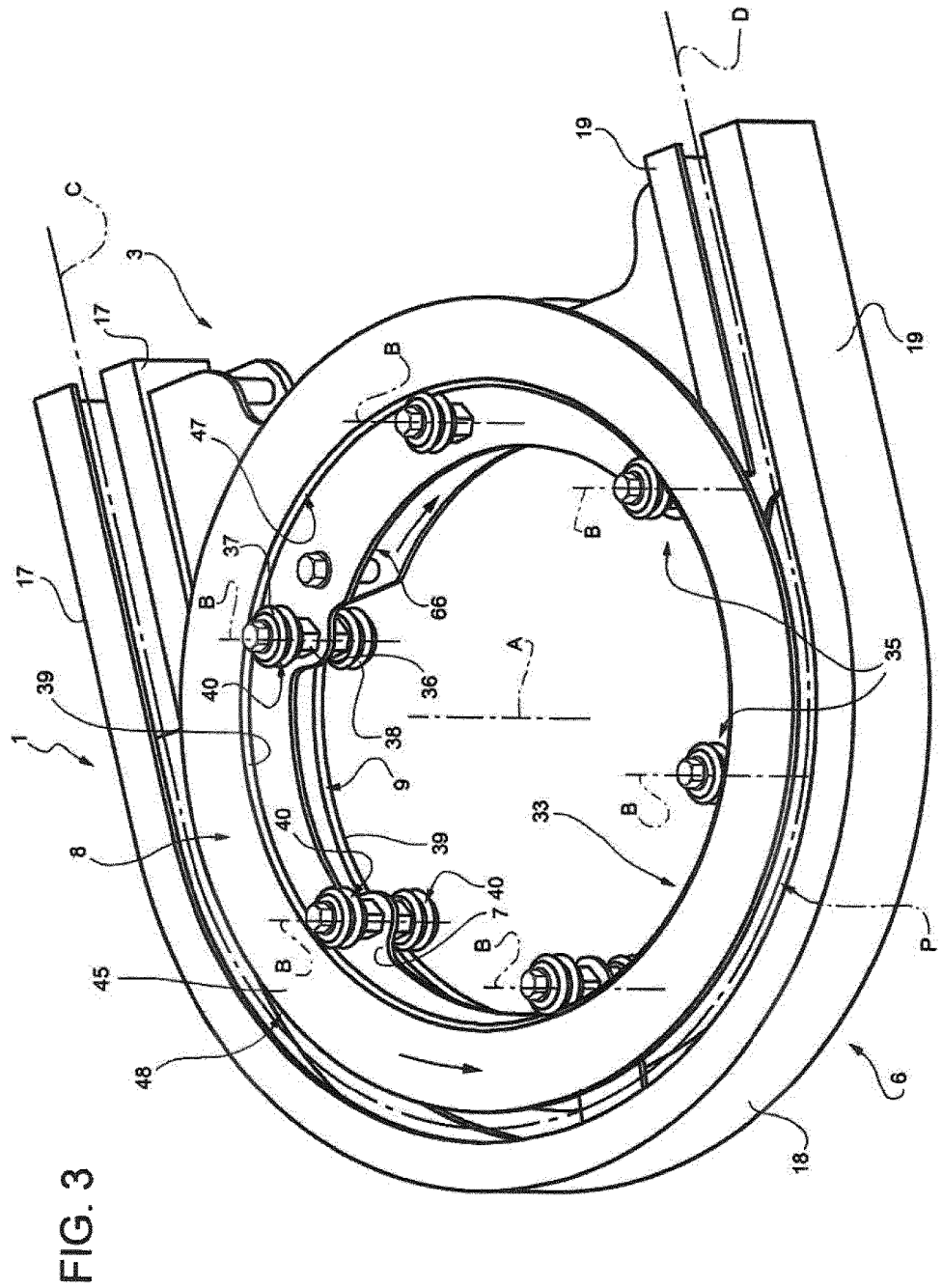
FIG. 3 is an enlarged perspective view of some components of the transfer device of FIG. 1, with parts removed for clarity.

Number 1 in FIGS. 1 to 3 indicates as a whole a transfer device for a packaging machine (not shown). Packaging machine continuously produces sealed packages 2 of a pourable food product, such as pasteurized or UHT milk, fruit juice, wine, etc., from a known tube of packaging material (not shown).

The tube is formed in known manner by longitudinally folding and sealing a known web (not shown) of heat-seal sheet material, which comprises a layer of paper material covered on both sides with layers of heat-seal plastic material, e.g. polyethylene. In the case of an aseptic package 2 for long-storage products, such as UHT milk, the packaging material comprises a layer of oxygen-barrier material, e.g. aluminium foil, which is superimposed on one or more layers of heat-seal plastic material eventually forming the inner face of the package contacting the food product.

The tube of packaging material is then filled with the food product for packaging, and is sealed and cut along equally spaced cross sections to form a number of pillow packs, which are then transferred to a folding unit where they are folded mechanically to form respective packages 2.

Transfer device 1 is fed by the folding unit with a plurality of folded packages 2, and defines an end station of the packaging machine.

Transfer device 1 substantially comprises:
a frame 3;
a looped chain conveyor 5 movable relative to frame 3 and formed by a plurality of links 4 (only some of which are shown in FIGS. 1 and 2) articulated to each other; and
supporting means 33 for supporting conveyor 5 relative to frame 3.

Frame 3 comprises, in turn:
a U-shaped body 6 surrounding conveyor 5 on the opposite side of axis A; and
an annular plate 7 which extends about axis A and is connected to body 6 on the side of axis A.

U-shaped body 6 comprises, in turn, (FIG. 3):
a pair of rectilinear walls 17 facing each other;
a pair rectilinear walls 19 parallel to walls 17, facing each other, and opposite to respective walls 17 relative to axis A; and
a curved wall 18 interposed between the walls 17, 19 which are radially outer relative to axis A.

Both radially outer walls 17, 19 and curved wall 18 are C-shaped in cross section and comprises (FIG. 2):
a main body 30; and
a pair of top and bottom wings 31 projecting from body 30 towards axis A.

Frame 3 further comprises:
a pair of fixed guides 26, 27 which are fitted to respective walls 18, 19 and are adapted to contain packages 2 on their lateral sides which is opposite to axis A; and
a pair of guide 28 which are fitted to wall 19 and are adapted to contain packages 2 on the side of axis A.

Conveyor 5 also comprises a work branch 10 and a return branch 11.

Work branch 10 conveys packages 2 along a path P which extends between a receiving station at which it is fed with folded packages from folding unit and the end station of the packaging machine.

Path P is U-shaped.

More precisely, work branch 10 comprises:
a rectilinear portion 12 which receives packages 2 from the folding unit and moves them along a direction C in a first sense;
a curved portion 13 which moves packages 2 along a substantially arch-shaped trajectory; and
a rectilinear portion 14 which moves packages 2 along a direction D parallel to and staggered from direction C, and in a second sense, opposite to the first sense.

In detail, curved portion 13 is substantially shaped as a circular arch of 180 degrees.

Portion 14 moves packages 2 towards a not-shown end of the packaging machine.

In the very same way, return branch 11 comprises a first and a second rectilinear portion arranged below portions 12, 14, and an arch-shaped portion 16 (FIG. 2) arranged between the first and second rectilinear portions and below portion 13.

Work branch 10 and return branch 11 move in opposite sense with respect to each other.

Portion 12 and first portion of return branch 11 are surrounded by respective walls 17 on both their sides; portions 13, 16 are surrounded, on the side opposite to axis A, by wall 18; and portion 14 and second portion of return branch 11 are surrounded by respective walls 19 on both theirs sides.

Guides 26 surround portions 11, 16 and are arranged on the opposite side of portions 11, 16 relative to axis A.

Guide 27 are arranged on the opposite side of portion 12 relative to axis A.

Guide 28 are arranged in front of guide 27 and on the side of axis A relative to portion 12.

In detail, conveyor 5 is looped about a pair of pulleys 21 (only one of which is shown in FIG. 1) which rotate about axes parallel to each other.

Supporting means 33 comprise, in turn, a pair of disks 8, 9 (FIGS. 2 and 3) which rotate about an axis A relative to frame 3.

As shown in FIG. 2, each link 4 substantially comprises:
a plate 22 lying in a plane orthogonal to axis A, upwardly (downwardly) projecting from disk 8 (9) and defining a top (bottom) end of link 4;
an element 23 arranged below (above) disk 8 (9);
a connecting stretch 24 axially interposed between plate 22 and element 23; and
an end 25 which is axially opposite to plate 22, is arranged on the opposite side of element 23 relative to stretch 24 and has a lower thickness than stretch 24.

In detail, disks 8, 9 support portions 13, 16 of conveyor 5 respectively and are rotatably supported about axis A relative to plate 7, which is only partly shown in FIG. 2.

Advantageously, transfer device 1 comprises an opening 20 arranged on one side of path P and adapted, in use, to allow the discharge of those packages 2 that have fallen along portion 13 of conveyor 5.

More precisely, opening 20 is tubular and extends about axis A.

Disks 8, 9 define each a through bore 39 which extends about axis A and surrounds opening 20 around axis A.

In particular, the thickness of disks 8, 9 parallel to axis A is less than the height of opening 20 parallel to axis A.

Disks 8, 9 are coaxial and counter-rotating.

Each disk 8, 9 comprises:
a pair of surfaces 45, 46 axially opposite to each other; and
a radially inner end 47;
a radially outer end 48 opposite to end 47 and axially interposed between surfaces 45, 46.

Disks 8, 9 are mounted opposite to each other. In particular, surfaces 46 face each other and are axially interposed between surfaces 45.

Surface 45 (46) defines a top end of disk 8 (9) while surface 46 (45) defines a bottom end of disk 8 (9).

End 48 of disk 8 (9) is arranged, with radial gap, on the opposite side of stretch 24 relative to corresponding wing 31.

Disk 8 rotates in the same sense of portion 13 while disk 9 rotates about axis A in the same sense of portion 16.

In the embodiment shown and with reference to FIG. 3, disk 8 rotates counterclockwise while disk 9 rotates clockwise.

Disks 8, 9 are rotatably supported about axis A relative to plate 7 through a plurality of bearing elements 35.

Plate 7 is annular relative to axis A, comprises a plurality of radial protrusions engaged by bearing elements 35 and defines a through bore 66 which extends about axis A.

Bearing elements 35 extend about relative axes B which are parallel to and staggered from axis A.

Furthermore, bearing elements 35 are angularly equispaced about axis A.

Each bearing element 35 comprises:
a central body 36 fitted to plate 7; and
a pair of rollers 37, 38 rotatable about relative axis B with respect to body 36.

In greater detail, rollers 37, 38 of each bearing element 35 define opposite axial ends of relative bearing element 35, and body 36 is axially interposed between relative rollers 37, 38.

Rollers 37, 38 are supported by body 36 through the interposition of top and bottom bearings 32 (FIG. 2).

Rollers 37, 38 of each bearing element 35 define respective grooves 40.

End 47 of each disk 8 (9) defines a radial annular protrusion which is arranged on the side of axis A and engages an annular groove 40 of relative roller 37 (38).

End 48 of each disk 8 (9) defines a radial annular protrusion which is radially opposite to end 47, and engage an annular seat 44 defined by links 4 which form portion 13 (16) of work branch 10 (return branch 11).

More precisely, seat 44 is axially bounded by plates 22 and elements 23 of those links 4 which form portion 13 (16) and is radially bounded, on the opposite side of axis A, by stretches 24 of these links 4.

In the embodiment shown, the protrusions defined by end 47 are, in cross section, V-shaped and converging towards axis A while the protrusions defined by end 48 are, in cross section, L-shaped.

Body 36 in made in two elements 68, 69 connected to each other by a screw 43. Furthermore, element 68 supports roller 37 and element 69 supports roller 38.

Top bearing 32 is axially mounted between a first washer and a first shoulder defined by element 68 of body 36. The first washer is pressed by a screw 41 against top bearing 32.

In the very same way, bottom bearing 32 is axially mounted between a second washer and a second shoulder defined by element 69. The second washer is axially pressed by a screw 42 against bottom bearing 32.

Transfer device 1 also comprises an annular cover (not shown in FIG. 3) which rotates together with disk 8 about axis A.

Cover 50 extends about axis A, is fitted to disk 8 through a plurality of screws 51 and covers top ends 49 of rollers 37.

Cover 50 substantially comprises:
a bottom surface 52 lying on a plane orthogonal to axis A, cooperating with surface 45 of disk 8 and screwed to disk 8;
a top surface 53 opposite to surface 52;
a lateral wall 54 annular relative to axis A; and
a contoured surface 55 which extends between surfaces 52, 53 and is axially spaced by ends 49 of rollers 37.

Cover 50 also comprises a continuous annular step 56 which extends about axis A and is opposite to surface 53 relative to axis A.

Step 56 contains packages 2 on the opposite side of guide 26.

Step 56 is arranged above and is separated by an axial gap from plates 22 of links 4 forming portion 13 of work branch 10 of conveyor 5.

Surface 53 is sloped relative to axis A and is, in particular, descending, proceeding from wall 54 towards axis A.

In particular, surface 53 is linearly descending and comprises, with reference to axis A, a radial outer end 57 and a radial inner end 58 opposite to each other.

End 58 of surface 53 also defines a top inlet end of opening 20.

Cover 50 and disk 8 also define, on the opposite side of axis A, an annular shoulder 59 which is partly engaged by radially inner ends 29 of plates 22 of links 4 forming portion 13.

Shoulder 59 is axially defined between step 56 and surface 45 of disk 8.

In particular, surface 45 of disk 8 is in part covered by ends 29 and in part by surface 52.

Surface 45 of disk 9 axially cooperates with ends 29 of plates 22 of links 4 forming portion 16 of return branch 11.

Surface 55 defines an annular seat 71 engaged with axial gap by heads of screws 41.

Furthermore, transfer device 1 comprises a body 60 (not shown in FIG. 3) which extends about axis A and defines opening 20.

In detail, body 60 comprises:
a tubular element 61 which passes through bore 39 of disk 8 with a radial gap, and is arranged below end 58 of surface 53; and
an annular plate 62 projecting from element 61 on the opposite side of axis A, and axially interposed between surface 55 and the plane of surface 45 of disk 8.

Element 61 defines the contour of opening 20.

Plate 62 is arranged, with an axial gap, above ends 49 of rollers 37 and below surface 55.

Plate 62 defines a plurality of radial through seats 70, trough which the heads of screws 41 pass.

Transfer device 1 also comprises (FIG. 1) a waste conveyor 65 having a portion arranged below opening 20. Conveyor 65 is adapted to receive fallen packages 2 from opening 20 and to move them away from packaging machine.

Conveyor 65 is, in the embodiment shown, a belt conveyor.

In actual use, work branch 10 of conveyor 5 receives folded packages 2 from the folding station and conveys them along path P and towards the end station of the packaging machine.

In detail, the folding unit feeds portion 12 of work branch 10 with folded packages 2.

Furthermore, portion 12 conveys packages 2 parallel to direction C and in the first sense, portion 13 conveys packages 2 along an arc-shaped portion and about axis A, and portion 14 conveys packages 2 parallel to direction D and in the second sense.

Portion 13 of conveyor 5 is supported by disk 8 which rotates about axis A together with cover 50. At the same time, portion 16 of return branch 11 is supported by disk 9 which rotates about axis A in the opposite sense of disk 8.

As moving along portion 13 of conveyor 5, packages are contained by guides 26 only on their radially outer sides with respect to axis A.

In case that they fall on portion 13 of conveyor 5, packages 2 slide onto surface 53; afterwards fallen packages 2 pass through the inlet defined by end 58 and fall inside opening 20.

Step 56 contains packages 2 on their inner radial side, i.e. on the opposite side relative to guide 26.

Conveyor 65 receives fallen packages 2 and conveys them away from packaging machine.

Packages 2 that have not fallen along portion 13 are advanced along portion 14 of work branch 10 and reach the end station of packaging machine.

Return branch 11 moves opposite to work branch 10.

The advantages of transfer device 1 and of the method according to the present invention will be clear from the foregoing description.

In particular, transfer device 1 comprises an opening 20 arranged on one side of path P.

In this way, those packages 2 that have fallen along curved portion of path P pass through opening 20 and reach conveyor 65.

Accordingly, those packages 2 that have fallen no longer stop along curved portion of path P and no longer cause the interruption of transfer device 1 and of the whole packaging machine.

Due to the fact that opening 20 allows the discharge of fallen packages, transfer device 1 no longer requires the presence of an inner radial guide to laterally contain packages 2. Accordingly, the design flexibility of transfer device 1 is enhanced.

Furthermore, descending surface 53 ease the movement of fallen packages 2 inside opening 20.

Finally, step 56 contains not fallen packages 2 on their radially inner side, i.e. on the opposite side of guide 26. In this way, step 56 prevents packages 2, especially those having at least partially round-shaped cross section, from rotating about their own axes.

Clearly, changes may be made to transfer device 1 and to the method as described and illustrated herein without, however, departing from the scope defined in the accompanying Claims.

The invention claimed is:

1. A transfer device for transferring sealed packages of a pourable food product, comprising:
   transporting means for conveying said packages along an at least partly curved path, the at least one curved path including a radially inner side positioned radially inward of the at least partly curved path and a radially outer side positioned radially outward of the at least partly curved path;
   a through opening which is arranged on one side of said path and is adapted, in use, to allow the discharge of the packages that have fallen along said path, the through opening being on the radially inner side of the at least partly curved path; and
   an annular disk which rotates about an axis passing through the through opening and which supports the transporting means, the disk surrounding the through opening.

2. The transfer device of claim 1, comprising a stationary hollow first body which defines at least one part of said opening.

3. The transfer device of claim 1, comprising:
   a fixed frame; and
   supporting means for supporting said transporting means relative to said frame;
   said supporting means comprising the disk constituting a first disk which cooperates with a work branch of said transporting means along the curved portion of said path, said first disk comprising a first through bore coaxial with said opening.

4. The transfer device of claim 3, wherein said supporting means comprise a plurality of bearing elements that rotatably support said at least one first disk with respect to said frame and about said first axis.

5. The transfer device of claim 4, wherein said bearing means comprise a plurality of bearing elements which extend about relative second axes radially spaced from and surrounding said axis.

6. The transfer device of claim 4, wherein each said bearing element comprises:
   at least one stationary body fitted to said frame; and
   a first roller rotatable about said stationary body about said second axis and comprising a first groove cooperating with a first protrusion defined by a first radially inner end of said first disk.

7. The transfer device of claim 4, wherein said supporting means comprise also a second disk axially opposite to said first disk and rotatable about said first axis in an opposite sense with respect to said first disk;
   said second disk cooperating with a return branch of said transporting means along the curved portion of said path; said second disk comprising a second through bore coaxial with and surrounding said opening.

8. The transfer device of claim 6, wherein each said bearing element comprises a second roller rotatable relative to said frame about said second axis and comprising a second groove cooperating with a second protrusion defined by a second radially inner end of said second disk.

9. The transfer device of claim 3, further comprising a hollow second body which may rotate about said axis and defines an inlet end of said opening; said second body being connected to said first disk.

10. The transfer device of claim 9, wherein said second body defines, on the opposite side of said opening, an annular step arranged at a given radial distance from said guide;

said step being adapted, in use, to contain said packages that have not fallen along said path.

11. The transfer device of claim 10, wherein said frame comprises a fixed guide adapted to contain, in use, said packages on the side thereof opposite to said annular step.

12. The transfer device of claim 11, wherein said second comprises, on the opposite side of said step, a surface rotatable together with said first disk, descending towards said opening and adapted to slideably cooperate with said fallen packages to ease their movement towards said opening.

13. The transfer device of claim 1, comprising a waste conveyor which has a portion arranged below said opening and adapted to move away said discharged packages from said transporting means.

14. A packaging machine for producing sealed packages of a pourable food product, comprising:
   a forming unit for forming said sealed packages;
   a transfer device according to claim 1 and arranged downstream from said forming unit.

15. The transfer device of claim 3, wherein said supporting means comprise also a second disk axially opposite to said first disk and rotatable about said first axis in an opposite sense with respect to said first disk;
   said second disk cooperating with a return branch of said transporting means along the curved portion of said path; said second disk comprising a second through bore coaxial with and surrounding said opening.

16. A method of removing fallen sealed packages of a pourable food product from a transfer device;
   said transfer device comprising, in turn:
      supporting means comprised of an annular disk which rotates about an axis passing through a through opening, the disk surrounding the through opening; and
      transporting means supported by said supporting means and configured to convey, in use, said packages along an at least partly curved path;
   the method comprising discharging those of said packages that have fallen along said path through the through opening surrounded by said disk, the through opening being located radially inwardly of the at least partly curved path.

17. A transfer device for transferring sealed packages of a pourable food product, comprising transporting means for conveying said packages along an at least partly curved path;
   comprising a through opening which is arranged on one side of said path and is adapted, in use, to allow the discharge of the packages that have fallen along said path;
   a fixed frame;
   supporting means for supporting said transporting means relative to said frame; and
   said supporting means comprising at least one first disk which extends and is rotatable about a first axis and cooperates with a work branch of said transporting means along the curved portion of said path, said first disk comprising a first through bore coaxial with and surrounding said opening.

18. The transfer device of claim 17, comprising a stationary hollow first body which defines at least one part of the through opening.

19. The transfer device of claim 17, comprising a waste conveyor that includes a portion arranged below the opening and configured to move the discharged packages away from the transporting means.

* * * * *